Oct. 6, 1959  E. P. ORVIS  2,907,943
ALTERNATOR-RECTIFIER GENERATING SYSTEM
Filed Jan. 12, 1956  2 Sheets-Sheet 1
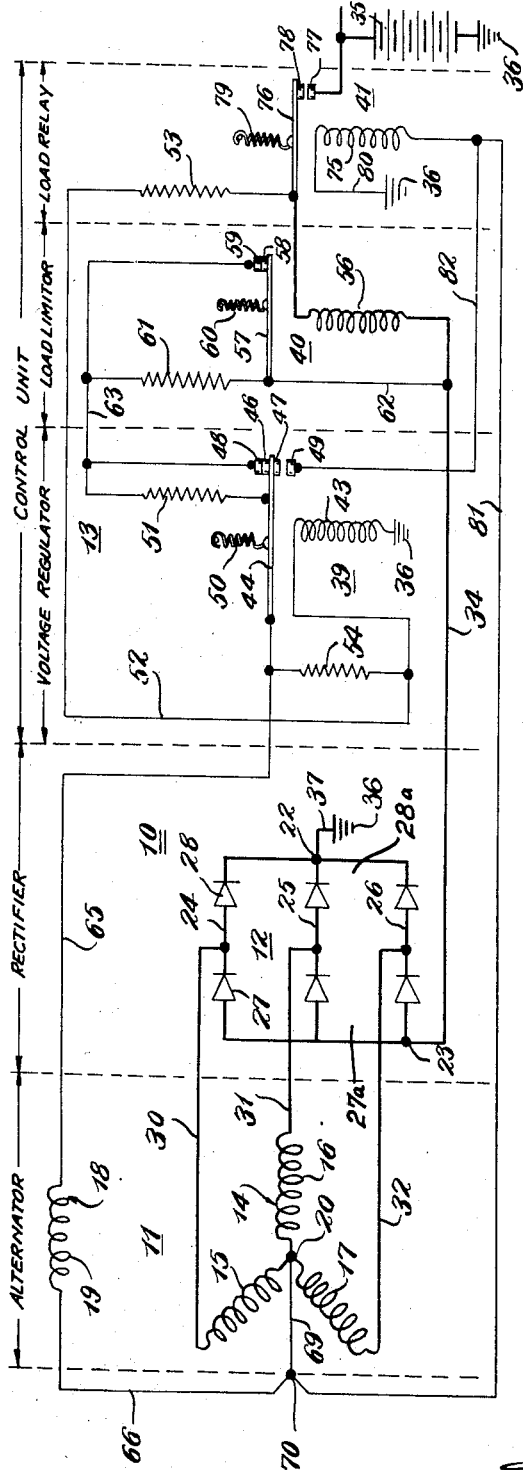
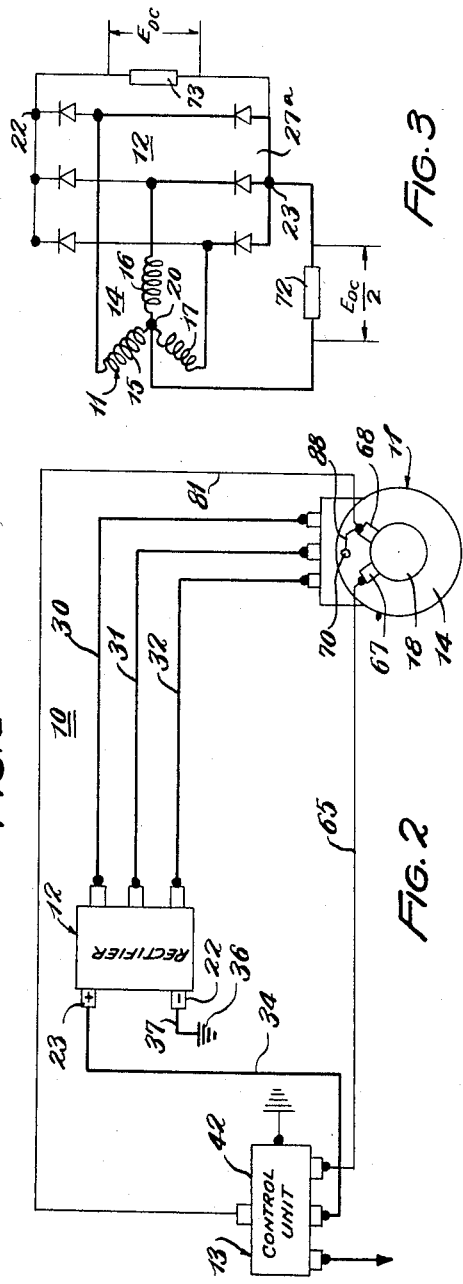
INVENTOR.
ELMER P. ORVIS
BY Hudson, Boughton
Williams, David & Hoffmann
ATTORNEYS Oct. 6, 1959
E. P. ORVIS
2,907,943
ALTERNATOR-RECTIFIER GENERATING SYSTEM
Filed Jan. 12, 1956
2 Sheets-Sheet 2
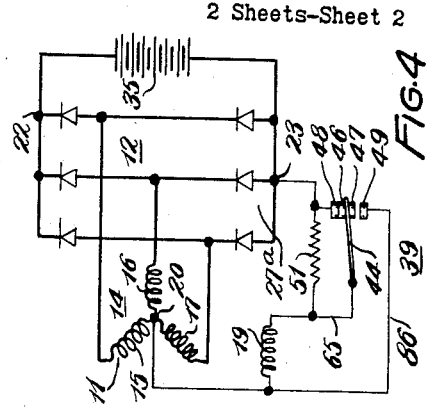
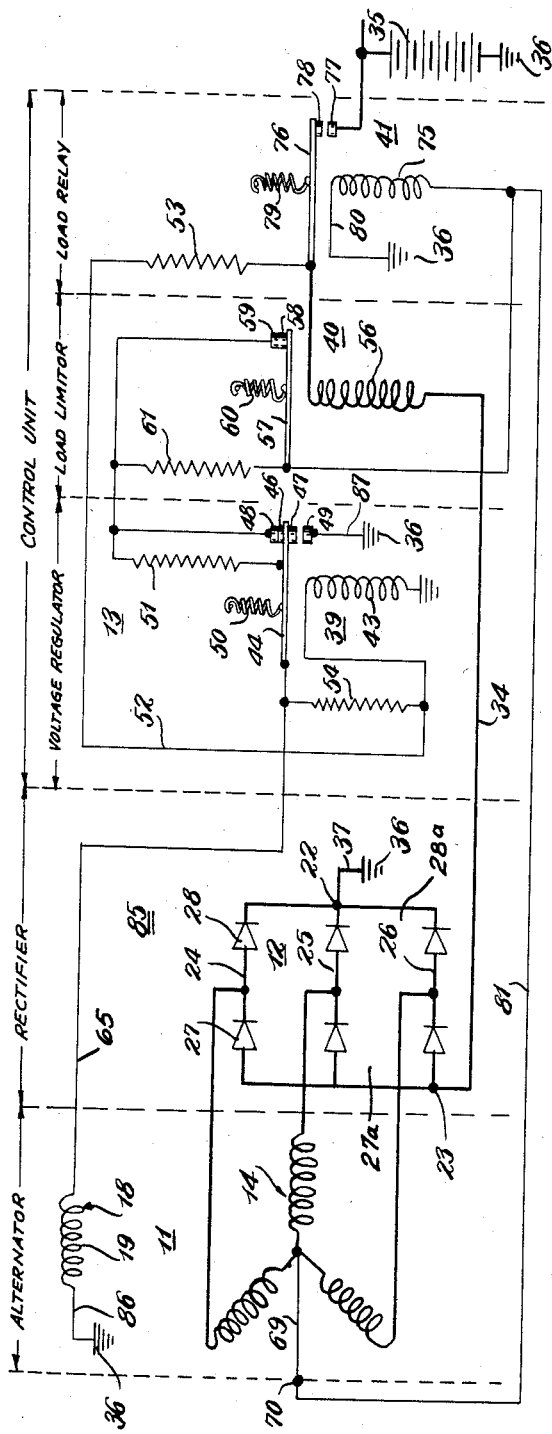
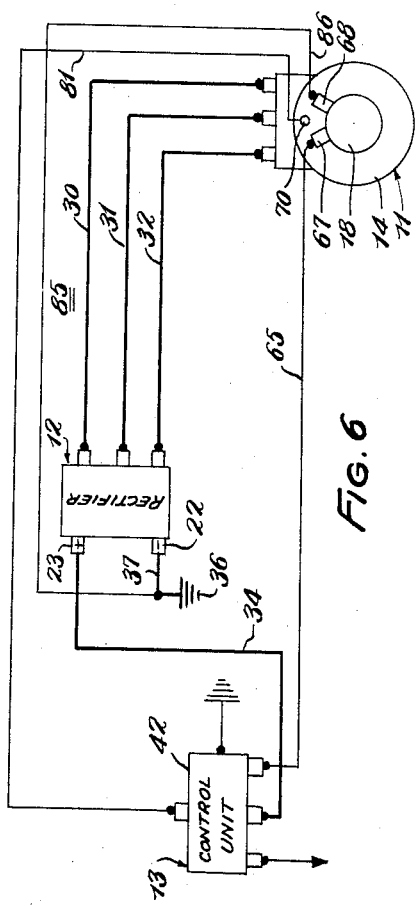
INVENTOR.
ELMER P. ORVIS
BY Hudson, Boughton,
Williams, David & Hoffmann
ATTORNEYS United States Patent Office 2,907,943
Patented Oct. 6, 1959

2,907,943
ALTERNATOR-RECTIFIER GENERATING SYSTEM

Elmer P. Orvis, Fairview Park, Ohio, assignor to The Leece-Neville Company, Cleveland, Ohio, a corporation of Ohio Application January 12, 1956, Serial No. 558,758

12 Claims. (Cl. 321—16)

This invention relates to generating systems of the alternator-rectifier type and having controlled field excitation.

When the field excitation of such a generating system is controlled by regulator means of the relay type and the system has a voltage rating of twelve volts or higher, a problem is encountered in preventing injurious sparking at the regulator contacts, and in preventing the occurrence of contact welding or other such serious damage which may result from an ionization or flash-over condition at the contacts, particularly when the regulator is of the kind having a double set of control contacts.

It is, therefore, an object of this invention to provide an alternator-rectifier generating system of the kind having regulator controlled field excitation and in which burning, welding or other such regulator contact injury is largely prevented by the use of novel circuit means whereby the voltage to which the regulator contacts are subjected is substantially lower than the rated output voltage of the system.

Another object is to provide a novel alternator-rectifier generating system employing a three-phase alternator having Y-connected inductor phase windings and a full-wave power rectifier, and in which the field winding of the alternator is energized by circuit means extending through the neutral point of the Y-connected phase windings.

A further object is to provide a novel alternator-rectifier generating system of the kind above referred to in which the rectifier comprises two half-wave sections and in which the regulator controlled field circuit extends through only one of such rectifier sections, whereby the voltage at the regulator contacts will be approximately one-half of the rated load terminal voltage of the system.

Still another object is to provide such an alternator-rectifier generating system which also comprises a load relay and in which the magnet coil of the load relay and the field winding of the alternator are energized by circuit means which extends through the neutral point of the phase windings of the alternator.

Additionally, this invention provides an alternator-rectifier generating system of the kind referred to above in which the regulator means is a voltage regulator of the double contact type.

Other objects and advantages of this invention will become apparent in the following detailed description and in the accompanying sheets of drawings forming a part of this specification and in which, Fig. 1 is a wiring diagram illustrating an alternator-rectifier generating system embodying the present invention;

Fig. 2 is another diagram of the same generating system;

Fig. 3 is a diagram illustrating the half-wave rectification feature used in this invention for obtaining rectified current of reduced voltage;

Fig. 4 is a simplified system diagram showing how the reduced regulator voltage is obtained;

Fig. 5 is a wiring diagram showing a generating system similar to that of Fig. 1 but representing a modification thereof; and Fig. 6 is another diagram of the generating system of Fig. 5.

As one practical embodiment of the present invention, Figs. 1 and 2 of the drawings show an alternator-rectifier generating system 10 which is well suited for vehicle use but which can also be used for various other purposes. The generating system 10 comprises in general an alternator 11, a power rectifier 12 through which the alternator supplies power to an external load, and a control unit 13.

The alternator 11 is a three-phase alternator comprising a stator 14 having inductor phase windings 15, 16 and 17, and a rotor 18 carrying a field winding 19. The phase windings 15, 16 and 17 are in a Y-connected relation and have a common neutral point 20.

The power rectifier 12 is a three-phase full-wave rectifier of the dry plate type of construction and has a pair of direct-current load terminals 22 and 23. The rectifier 12 is of the bridge type having three circuit arms 24, 25 and 26, each containing a pair of rectifier cells 27 and 28. The phase windings 15, 16 and 17 of the alternator 11 are connected with the respective circuit arms 24, 25 and 26 of the rectifier 12 by the conductors 30, 31 and 32. The connection of the conductors 30, 31 and 32 with the circuit arms 24, 25 and 26 is made at a point between the rectifier cells 27 and 28 of these circuit arms. From the arrangement of the rectifier cells and the circuit connections therewith, it will be observed that the group or bank of rectifier cells 27 constitute one half-wave rectifier section and the group or bank of rectifier cells 28 constitute a second half-wave rectifier section.

The generating system 10 is shown as having a load conductor 34 connected with the direct-current terminal 23 of the rectifier 12 for supplying current to an external load which consists of, or includes, a storage battery 35. As here shown, the generating system 10 has one polarity side of its circuit grounded through a common ground 36 to which one terminal of the battery 35 is connected and to which the direct-current terminal 22 of the power rectifier 12 is connected by the conductor 37.

The control unit 13 comprises a voltage regulator 39, a load limiter or current regulator 40, and a load relay 41. The voltage regulator, load limiter, and load relay are preferably located in a single housing such as the housing 42 shown in Fig. 2 of the drawings.

The voltage regulator 39 comprises an electromagnet having a magnet coil 43, and a vibratory armature 44 which is responsive to variations in the energization of the magnet coil. The voltage regulator 39 also comprises a pair of movable contacts 46 and 47 carried by the armature 44 and cooperating respectively with upper and lower stationary contacts 48 and 49.

The cooperating contacts 46 and 48 constitute a first switch means of which the movable contact 46 is normally urged toward engagement with the stationary contact 48 by a tension spring 50. The cooperating contacts 47 and 49 constitute a second switch means which is normally open. The voltage regulator 39 also comprises a resistor 51 which is in a shunt relation to the cooperating contacts 46 and 48.

The magnet coil 43 of the voltage regulator 39 is a voltage coil which is energized from the alternator 11 by being connected across the load terminals 22 and 23 of the rectifier 12. The energizing circuit for the magnet coil 43 extends through a conductor 52 which connects one end of this magnet coil with the load conductor 34 through a ballast resistance 53. The other end of this magnet coil is connected with the load terminal 22 through the common ground 36. A secondary resistance 54 is connected with the ungrounded terminal of the magnet coil 43 and with the armature 44, so as to increase the effectiveness of the magnet coil in causing the vibratory action of the armature.

The load limiter or current regulator 40 comprises an electromagnet having a series magnet coil 56, and a vibratory armature 57 which is responsive to changes in the energization of the magnet coil. The load limiter 40 also comprises a movable contact 58 carried by the armature 57 and a stationary contact 59 with which the movable contact cooperates. The movable contact 58 is urged toward engagement with the stationary contact 59 by a tension spring 60 connected to the armature 57.

The load limiter 40 also comprises a resistor 61 connected in shunt relation to the switch contacts 58 and 59. The armature 57 is connected with the load conductor 34 through a conductor 62, and the stationary contacts 48 and 59 of the voltage regulator 39 and the current limiter 40 are connected with each other by the common conductor 63.

The field winding 19 of the alternator 11 has conductors 65 and 66 connected with opposite ends thereof and brought out of the housing of the alternator through a pair of field brushes 67 and 68. A conductor lead 69 connected with the neutral point 20 of the phase windings of the alternator is brought to the outside of the alternator housing through a terminal 70. As shown in Fig. 1, the conductor 65 from the field winding 19 is connected with the armature 44 of the voltage regulator and the other field conductor 66 is connected with the neutral point 20 of the phase windings by being connected to the terminal 70.

From the circuit connections above described for the field winding 19 and for the voltage regulator and the load limiter, it will be seen that the energization circuit of the field winding extends through the neutral point 20 and through the half-wave rectifier section 27ª, and that the field circuit also contains the switch contacts of the voltage regulator and the switch contacts of the load limiter. The excitation of the field winding 19 is controlled in accordance with the operating condition of the alternator 11 by reason of the fact that the resistors 51 and 61 are in the field circuit and whenever the contacts of the load limiter or the upper pair of contacts of the voltage regulator are open, the corresponding resistor will be inserted in a series relation in the field circuit. Whenever the upper pair of contacts 46 and 48 of the voltage regulator are closed the resistor 51 is short-circuited and similarly, whenever the switch contacts 58 and 59 of the load limiter are closed, the resistor 61 is short-circuited.

In generating systems using regulator means of the relay type for controlling the field excitation of the generator or alternator, problems have been encountered because of the occurrence of sparking at the regulator contacts and at times there has been a tendency for the regulator contacts to become burned or welded together, particularly in the case of voltage regulators of the double-contact type used in a generating system having a rated terminal voltage of twelve volts or higher. If the sparking occurring at the regulator contacts produces an ionized condition of the adjacent atmosphere, such welding together of the regulator contacts can readily occur as the result of a flash-over taking place through the ionized atmosphere and between the upper and lower stationary contacts 48 and 49 of the voltage regulator.

In the generating system 10, such burning or welding of the regulator contacts is substantially prevented by reason of the fact that the field circuit voltage at the regulator contacts is materially lower than the rated voltage of the system as represented by the terminal voltage across the load terminals 22 and 23 of the rectifier 12. This relatively lower field circuit voltage results from the fact that the field circuit extends through the neutral point 20 and through only one of the half-wave sections of the rectifier 12, namely the half-wave rectifier section 27ª.

Fig. 3 of the drawings is a simplified diagram showing how such a substantially lower voltage is obtained for an auxiliary load 72, as compared with the voltage being supplied to a main external load 73 which is connected across the direct-current load terminals 22 and 23 of the power rectifier 12. For comparison purposes, the components of Fig. 3 which correspond with components of the system 10 have been designated by the same reference characters. In the diagram of Fig. 3 the auxiliary load 72 is connected with the phase windings of the alternator 11 through the neutral point 20 and through the half-wave section 27ª of the rectifier 12. From the diagram of Fig. 3 it will be apparent, therefore, that the voltage being supplied to the auxiliary load 72 is approximately one-half of the voltage being supplied to the main load 73.

The diagram of Fig. 4 represents a simplification of the generating system 10 and shows how the circuit connections for the field winding 19 of the alternator 11 and for the voltage regulator 39 result in the above-mentioned relatively reduced field circuit voltage at the regulator contacts. It will be apparent from a comparison of this simplified diagram with the diagram of Fig. 3 that the field circuit voltage at the regulator contacts will be approximately one-half of the voltage across the direct-current load terminals 22 and 23 of the rectifier 12.

The load relay 41 comprises an electromagnet having a voltage magnet coil 75 and an armature 76 which is responsive to the energization of this magnet coil. The load relay also comprises cooperating series switch contacts 77 and 78, of which the contact 77 is a stationary contact and the contact 78 is a movable contact carried by the armature 76. A tension spring 79 connected with the armature 76 urges the movable contact 78 toward an open condition of the external load circuit. The magnet coil 75 is responsive to the operation of the alternator 11 and causes automatic closing of the switch contacts 77 and 78.

The magnet coil 75 of the load relay 41 is connected in circuit with the alternator 11 by having one end thereof connected with the common ground 36 by the conductor 80 and its other end connected with the neutral point 20 by a conductor 81. The stationary lower contact 49 of the voltage regulator 39 is also connected with the neutral point 20 through a conductor 82 and a common portion of the conductor 81.

From the circuit connections above described for the magnet coil 43 and the lower stationary contact 49 of the voltage regulator 39, it will be seen that whenever the contacts 47 and 49 are closed, the field winding 19 will be substantially short-circuited for a relatively quick collapse of its magnetic field.

Figs. 5 and 6 show an alternator rectifier system 85 which is generally similar to the above described system 10 and the corresponding parts of the modified system are designated by the same reference characters. The modified system 85 differs from the system 10 in that it is somewhat simplified by reason of the fact that one end of the field winding 19 is connected with the common ground 36 through the conductor 86 and the stationary lower contact 49 of the voltage regulator 39 is connected with the common ground through a conductor 87. In the generating system 10 it is only necessary to have the two conductors 65 and 81 extend from the brushes and neutral terminal 70 of the alternator inasmuch as the neutral terminal can be connected with the brush 68 by the conductor 88, as shown in Fig. 2, whereas in the system 85 three conductors, namely the conductors 65, 81 and 86, are generally needed. The conductors 65 and 86 are connected with the brushes 67 and 68 and the conductor 81 connects the neutral terminal of the alternator with the control unit 13.

From the accompanying drawings and the foregoing detailed description, it will now be readily understood that this invention provides a novel alternator-rectifier type of generating system having regulator controlled field excitation and in which the regulator contacts are subjected to a relatively low operating voltage as compared with the rated terminal voltage of the system, and hence will be subjected to only minimum sparking or welding tendency and will accordingly have a long and efficient operating life. It will now also be understood that the relatively reduced field circuit voltage at the regulator contacts is obtained by the use of a field circuit extending through the neutral point of a Y-connected three-phase alternator and through one half-wave section of a full-wave three-phase power rectifier.

Although the alternator-rectifier generating systems of this invention have been illustrated and described herein to a somewhat detailed extent, it will be understood, of course, that the invention is not to be regarded as being limited correspondingly in scope but includes all changes and modifications coming within the terms of the claims hereof.

Having thus described my invention, I claim:

1. In an alternator-rectifier generating system, a three-phase alternator having inductor phase windings and a field winding, said phase windings being Y-connected through a common neutral point, a power rectifier, an external direct-current load circuit connected with said alternator through said power rectifier, relay type regulator means, and a field circuit connecting said field winding with said phase windings through said neutral point and also connecting said field winding through said regulator means to a portion only of said rectifier.

2. In an alternator-rectifier generating system, a three-phase alternator having inductor phase windings and a field winding, said phase windings being Y-connected through a common neutral point, a power rectifier connected with said phase windings and having direct-current load terminals, an external direct-current load circuit connected with said alternator through said power rectifier, relay type regulator means, and a field circuit connecting said field winding with said phase windings through said neutral point and through said regulator means to a portion only of said rectifier, said field circuit being energized by rectified current of a voltage substantially less than the terminal voltage across the load terminals of said rectifier.

3. An alternator-rectifier generating system as defined in claim 2 in which said power rectifier is a three-phase full-wave rectifier comprising two half-wave rectifier sections, and in which the energization of said field circuit is controlled by said regulator and is through one of said half-wave rectifier sections and at a voltage approximately one-half of the voltage across the load terminals of said rectifier.

4. In an alternator-rectifier generating system, a three-phase alternator having inductor phase windings and a field winding, said phase windings being Y-connected and having a common neutral point, a power rectifier connected with said phase windings and having direct-current load terminals, a regulator of the relay type comprising a magnet coil in circuit with said load terminals and switch contacts responsive to the energization of said coil, and a field circuit connecting said field winding with said inductor windings through said neutral point and connecting said field winding through said switch contacts to a portion only of said rectifier.

5. In an alternator-rectifier generating system, a three-phase alternator having inductor phase windings and a field winding, said phase windings being Y-connected and having a common neutral point, a power rectifier connected with said phase windings and having direct-current load terminals, regulator means of the relay type comprising a magnet coil in circuit with said load terminals and switch contacts responsive to the energization of said coil, and a field circuit controlled by said switch contacts and connecting said field winding with said inductor windings through said neutral point and through said contacts to a portion only of said rectifier so that the field circuit voltage at said contacts is substantially less than the terminal voltage across the load terminals of said rectifier.

6. In an alternator-rectifier generating system, a three-phase alternator having inductor phase windings and a field winding, said phase windings being Y-connected and having a common neutral point, a three-phase full-wave power rectifier connected with said phase windings and having direct-current load terminals, said rectifier comprising two half-wave rectifier sections, regulator means of the relay type comprising a magnet coil in circuit with said load terminals and switch contacts responsive to the energization of said coil, and a field circuit controlled by said switch contacts and connecting said field winding with said inductor windings through said neutral point and through said contacts to one of said rectifier sections so that the field circuit voltage at said contacts is approximately one-half of the terminal voltage across the load terminals of said rectifier.

7. In an alternator-rectifier generating system, a three-phase alternator having inductor phase windings and a field winding, said phase windings being Y-connected and having a common neutral point, a three-phase full-wave power rectifier connected with said phase windings and having direct-current load terminals, said rectifier comprising two half-wave rectifier sections, a voltage regulator of the relay type comprising a voltage magnet coil connected across the load terminals of said rectifier and switch contacts responsive to the energization of said coil, a field circuit containing said switch contacts and connecting said field winding with said inductor windings through said neutral point and through said switch contacts to one of said rectifier sections, and resistor means in said field circuit in shunt relation to said switch contacts, the field circuit voltage at said contacts being approximately one-half of the voltage across said load terminals.

8. An alternator-rectifier generating system as defined in claim 7 in which the switch contacts of said voltage regulator constitute a normally closed switch in said field circuit and a normally open second switch, and in which circuit means completed by the closing of said second switch substantially short-circuits said field winding.

9. In an alternator-rectifier generating system, a three-phase alternator having inductor phase windings and a field winding, said phase windings being Y-connected and having a common neutral point, a three-phase full-wave power rectifier connected with said phase windings and having direct-current load terminals, said rectifier comprising two half-wave rectifier sections, an external load circuit connected with said load terminals, a voltage regulator of the relay type comprising a voltage magnet coil connected across said load terminals and first switch contacts responsive to the energization of said voltage coil, a load limitor of the relay type comprising a series magnet coil in said load circuit and second switch contacts responsive to the energization of said series coil, a field circuit containing said first and second switch contacts and connecting said field winding with said inductor windings through said neutral point and through said switch contacts to one of said rectifier sections, and resistor means in said field circuit in shunt relation to said first and second switch contacts, the field circuit voltage at said first and second switch contacts being substantially less than the voltage across said load terminals.

10. In an alternator-rectifier generating system, a three-phase alternator having inductor phase windings and a field winding, said phase windings being Y-connected and having a common neutral point, a three-phase full-wave power rectifier connected with said phase windings and having direct-current load terminals, said rectifier comprising two half-wave rectifier sections, an external load circuit connected with said load terminals, a voltage regulator of the relay type comprising a voltage magnet coil connected across said load terminals and switch contacts responsive to the energization of said coil, a load relay comprising a relay magnet coil and normally open series switch contacts in said load circuit and adapted to be closed in response to energization of said relay coil, a field circuit containing the switch contacts of said voltage regulator and connecting said field winding with said inductor windings through said neutral point and through said switch contacts of said voltage regulator to one of said rectifier sections, and circuit means connecting said relay magnet coil with said alternator through said neutral point and one of said load terminals, the field circuit voltage at the switch contacts of said regulator being substantially less than the voltage across said load terminals.

11. An alternator-rectifier generating system as defined in claim 10 in which the switch contacts of said voltage regulator constitute a normally closed switch in said field circuit and a normally open second switch, and in which said field winding is substantially short-circuited through at least a portion of the last-mentioned circuit means by the closing of said second switch.

12. In an alternator-rectifier generating system, a three-phase alternator having a stator carrying inductor phase windings and a rotor carrying a field winding, brush means cooperating with said rotor, said phase windings being Y-connected and having a common neutral point, a three-phase full-wave power rectifier connected with said phase windings and having direct-current load terminals, said rectifier comprising two half-wave rectifier sections, an external load circuit connected with said load terminals, regulator means of the relay type comprising a magnet coil in circuit with said load terminals and switch contacts responsive to the energization of said magnet coil, a field circuit containing said switch contacts and connecting said field winding with said inductor windings through said brush means and neutral point and through said switch contacts to one of said rectifier sections, and resistor means in said field circuit in shunt relation to said switch contacts, the field circuit voltage at said switch contacts being approximately one-half of the voltage across said load terminals.

References Cited in the file of this patent

UNITED STATES PATENTS

| | | |
|---|---|---|
| 930,325 | Thomas | Aug. 3, 1909 |
| 2,075,105 | Evans | Mar. 30, 1937 |
| 2,519,650 | Hamilton | Aug. 22, 1950 |
| 2,568,407 | Pattison et al. | Sept. 18, 1951 |
| 2,614,241 | Diamantides | Oct. 14, 1952 |
| 2,616,073 | Short et al. | Oct. 28, 1952 |
| 2,646,543 | Gilchrist | July 21, 1953 |
| 2,710,927 | Moore | June 14, 1955 |